United States Patent
Mazur et al.

(10) Patent No.: US 6,203,059 B1
(45) Date of Patent: Mar. 20, 2001

(54) SEAT BELT USAGE INDICATING SYSTEM

(75) Inventors: Joseph F. Mazur, Washington; Brian K. Blackburn, Rochester; Scott B. Gentry, Romeo; H. John Miller, III, Macomb Township, Macomb County, all of MI (US)

(73) Assignee: Breed Automotive Technologies, Inc., Lakeland, FL (US)

( * ) Notice: Subject to any disclaimer, the term of this patent is extended or adjusted under 35 U.S.C. 154(b) by 0 days.

(21) Appl. No.: 09/239,611

(22) Filed: Jan. 29, 1999

(51) Int. Cl.[7] .................................................. B60R 21/32
(52) U.S. Cl. ........................ 280/735; 340/457.1; 701/45
(58) Field of Search ............................ 280/735; 180/268; 340/457.1, 667, 438; 701/45

(56) References Cited

U.S. PATENT DOCUMENTS

| | | | |
|---|---|---|---|
| 3,787,804 | * | 1/1974 | MacDonald .......................... 180/268 |
| 4,346,778 | * | 8/1982 | Blüggel et al. ...................... 180/268 |
| 4,885,566 | | 12/1989 | Aoki et al. . |
| 5,590,904 | * | 1/1997 | Ellis et al. ........................... 280/735 |
| 5,605,348 | * | 2/1997 | Blackburn et al. .................. 280/735 |
| 5,618,056 | * | 4/1997 | Schoos et al. ....................... 280/735 |
| 5,758,737 | * | 6/1998 | Brown et al. ........................ 180/268 |
| 5,906,393 | * | 5/1999 | Mazur et al. ........................ 280/735 |

FOREIGN PATENT DOCUMENTS

| | | |
|---|---|---|
| 197 39 753 | 3/1999 | (DE) . |
| 2 755 082 | 4/1998 | (FR) . |

OTHER PUBLICATIONS

Research Disclosure #38224, "Combined Tag Antenna For Rearward Facing Infant Seat And Occupant Detection Sensor", Feb. 1996.*

* cited by examiner

Primary Examiner—Lanna Mai
Assistant Examiner—Lynda Jasmin
(74) Attorney, Agent, or Firm—Markell Seitzman

(57) ABSTRACT

An occupant safety protection system (8) capable of sensing the misuse of a safety belt system (10). The invention includes: a shoulder belt portion (13), a field generator means (243) for generating a detection field (202), a disturbance tag means (250) attached to the shoulder belt portion (13) and a tag detection circuit means (19) which determines seat belt misuse and sends an output indicative thereof. When the seat belt system is being properly used the disturbance tag (250) does not disturb the detection field. Conversely, when the seat belt system is being improperly used the disturbance tag disturbs the detection field. The tag detection circuit sends an output indication (245) corresponding to the state of the seat belt system use.

6 Claims, 7 Drawing Sheets

SEAT BELT USAGE INDICATING SYSTEM

BACKGROUND AND SUMMARY OF THE INVENTION

This invention generally relates to a vehicle occupant restraint system for a three-point seat belt system. More specifically, the invention relates to a system having means for determining if a seat belt is being used properly by an occupant.

It is well known in the art that using a three-point seat belt, in a vehicle, will aid in preventing injury to an occupant. A three-point seat belt system typically comprises a retractor, D-ring or belt guide, a buckle and associated tongue, lower belt restraint anchor and seat belt webbing. Generally, the seat belt webbing (or seat belt) is divided into a lap (belt) portion and a shoulder (belt) portion. The proper or intended use of the seat belt is for the occupant to wear or to install the shoulder belt portion across his upper torso and the lap belt portion across his lap. It is also known that some occupants, for whatever reason, occasionally place the shoulder belt portion belt behind their backs with the lap belt portion buckle about the waist. If the seat belt is utilized in this improper manner the vehicle occupant's upper torso cannot be restrained during a crash event. This improper use of the seat belt will minimize the occupant restraining qualities of the restraint system. This improper use is also important in relation to the operation of a "smart" air bag restraint system which controls the inflation of the air bag during an accident. With the seat belt improperly used the occupant's upper torso, during a crash, will move forwardly into the inflating air bag. With knowledge of the state of use or misuse of the seat belt this information can be used to lower the inflation rate of the inflating air bag or negate the operation of the air bag.

One of the objects of this invention is to provide a system that is capable of determining if an occupant is not wearing the seat belt as it was designed to be used. It is a second object of this invention to provide at a minimum, a warning signal to reinforce to the occupant (or at least to a responsible adult) of improper seat belt use so that the seat belt can be placed properly about the occupant. Finally, it is an object of the present invention to modify the operation of other on-board safety restraint systems, such as an air bag system, based on the state of use or misuse of the seat belt.

Many other objects and purposes of the invention will be clear from the following detailed description of the drawings.

DETAILED DESCRIPTION OF THE DRAWINGS

Figure 1:
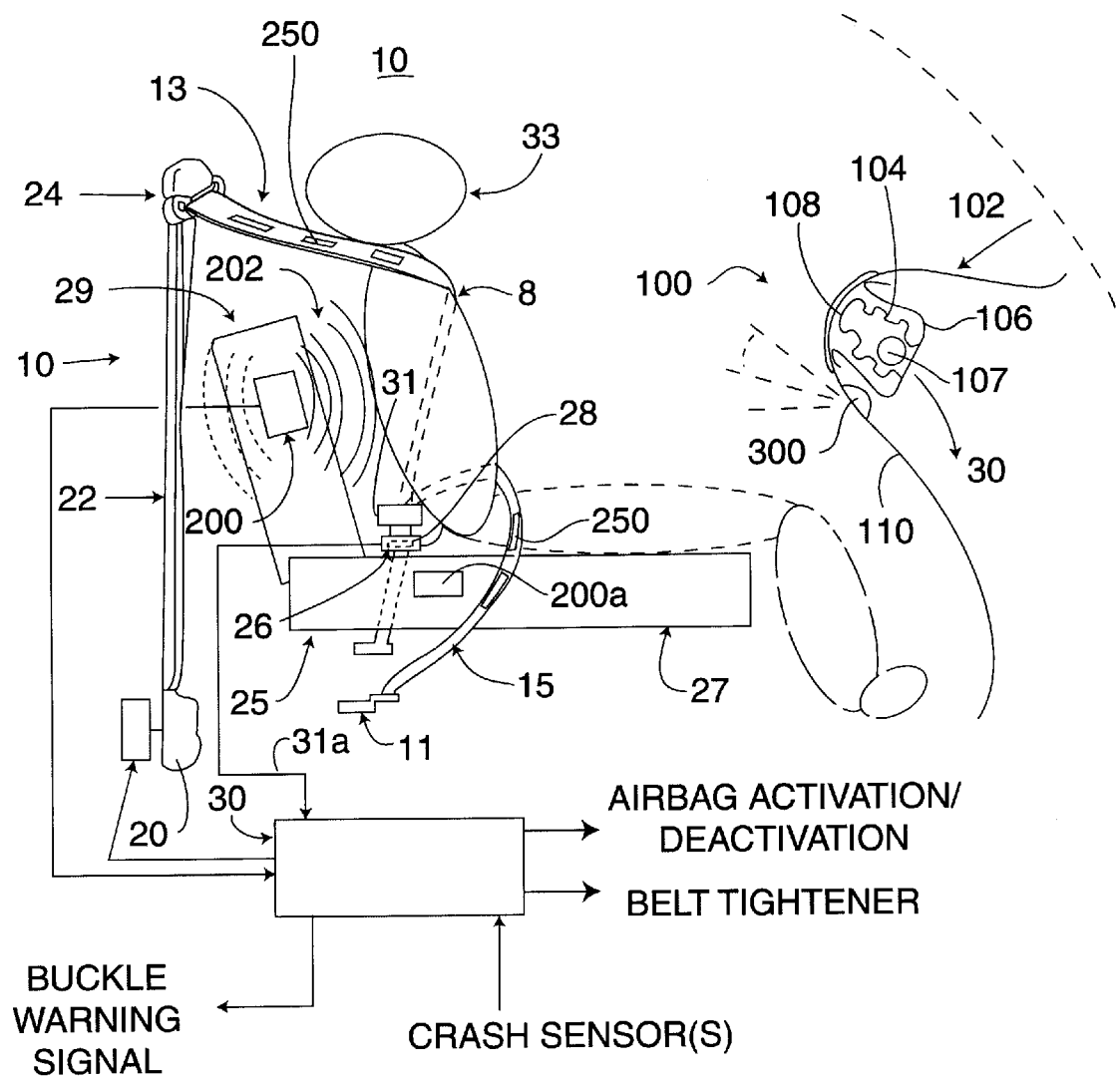
FIG. 1 diagrammatically shows a three-point seat belt system properly installed about an occupant and also illustrates many of the elements of the present invention.
Figure 1A:
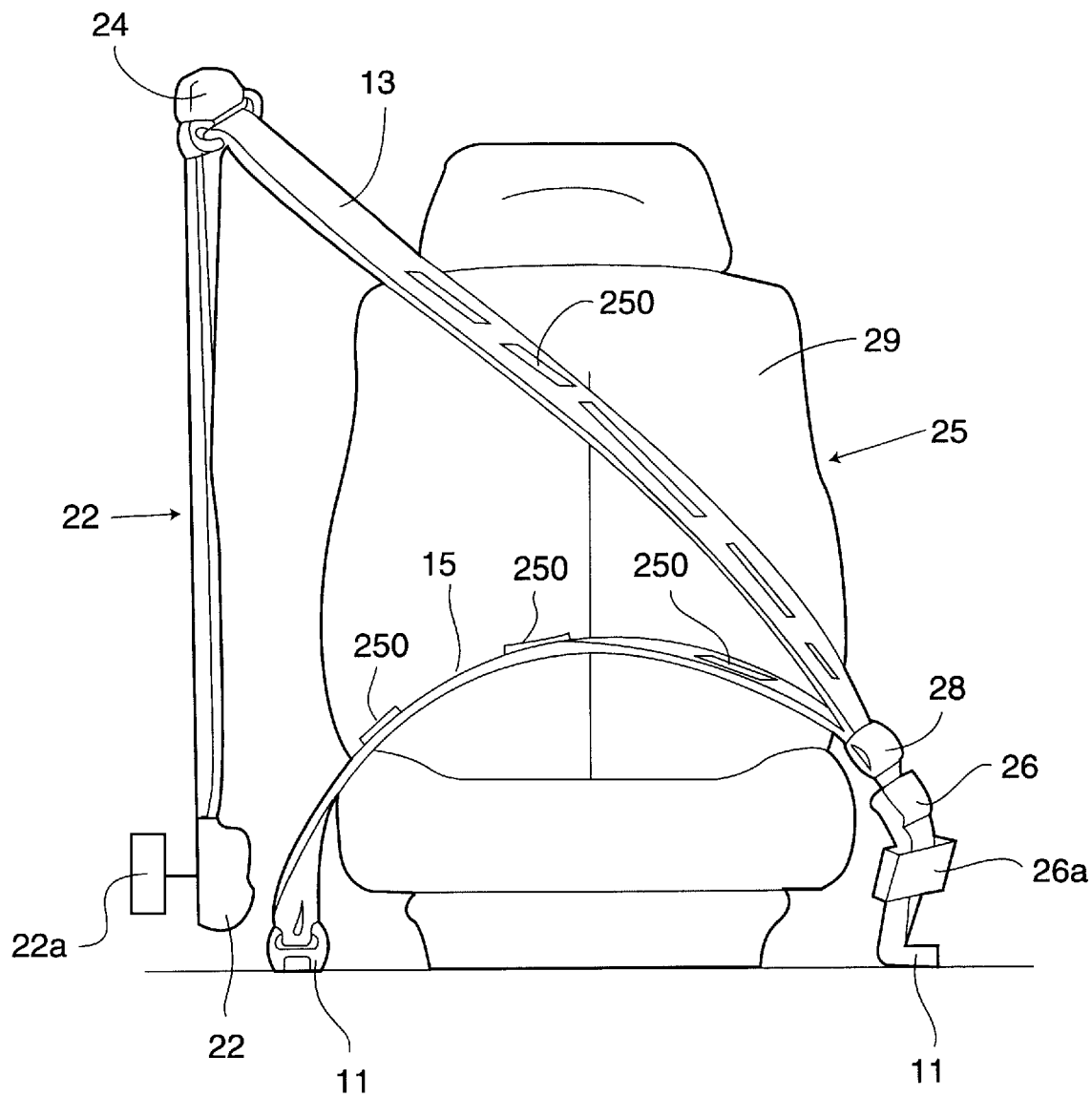
FIG. 1A is a front view of a vehicle seat and three-point belt system.

FIGS. 1 and 1A show a typical three-point occupant safety restraint system 10 having a seat belt system 8 comprising, a seat belt retractor 20 typically mounted to a part of the vehicle frame (not shown) or mounted within a seat 25 (typically within the seat back 29). Seat belt webbing 22 is wound about a spool of the retractor 20 and is guided about a seated occupant. This guide is accomplished by a D-ring or web guide 24 which also can be secured to a vehicle part such as the B or C pillar or integrated within the seat 25. The typical three-point system would further include a seat belt buckle 26 and a tongue or tongue plate 28 latchably received within the buckle. The buckle may include a switch 31 which generates a signal 31a to indicate that the tongue has been properly received and locked within the buckle. The switch 31 is connected to a control module 30. The control module 30 may generate a warning signal (a light, a tone or spoken phrase) if the tongue is not secured within the buckle at a determinable time after the start of the vehicle engine as is known in the art. If the buckle latch signal 31a is not present, the control module 30 will prevent components of the system such as a pretensioner and/or air bag from operating or at least change their mode of operation.

The webbing (seat belt 22) is divided into two segments, a lap (belt) portion 15 and a shoulder (belt) portion 13. The lap belt portion 15 is defined as that segment of the seat belt webbing which extends to the tongue plate 28 and is fixedly connected to (one of the) the anchor points 11.

The seat belt system may optionally include one of a retractor pretensioner (or belt tightener as it is also called in the art) 20a or a buckle pretensioner (or belt tightener) 26a. Both of these devices are well known and may be realized in many different constructions. Either belt tightener, when activated, is designed to reduce seat belt slack about the occupant. The retractor belt tightener causes the retractor 20 to reverse wind pulling the shoulder belt 13 more tightly about the occupant. Depending on the type of tongue used (such as a slip tongue), the tightening of the shoulder belt may also cause the lap belt to tighten about the lower torso of the occupant. The buckle pretensioner 26a, when activated will pull the buckle 26 down (toward) the floor to eliminate slack in the system.

FIG. 1 also diagrammatically shows a typical air bag system 100 which conceptually can be either a passenger side or driver side system (or even a side impact system). In either case the air bag system 100 will include a module 102 comprising an air bag 104 typically mounted within or to a housing 106, an inflator 107 (to generate inflation gas to inflate the bag) and a protective, tearable cover 108 which often includes tear seams to facilitate the opening of the cover. In the case of a passenger side system the module 102 is positioned in the instrument panel 110. In the case of a driver side system, the module 102 would be located within the steering wheel (not shown). The system 100 is activated upon receipt of a crash signal from one or more crash sensors. This crash signal can, for example, be communicated to the control module 30.

Figure 2:
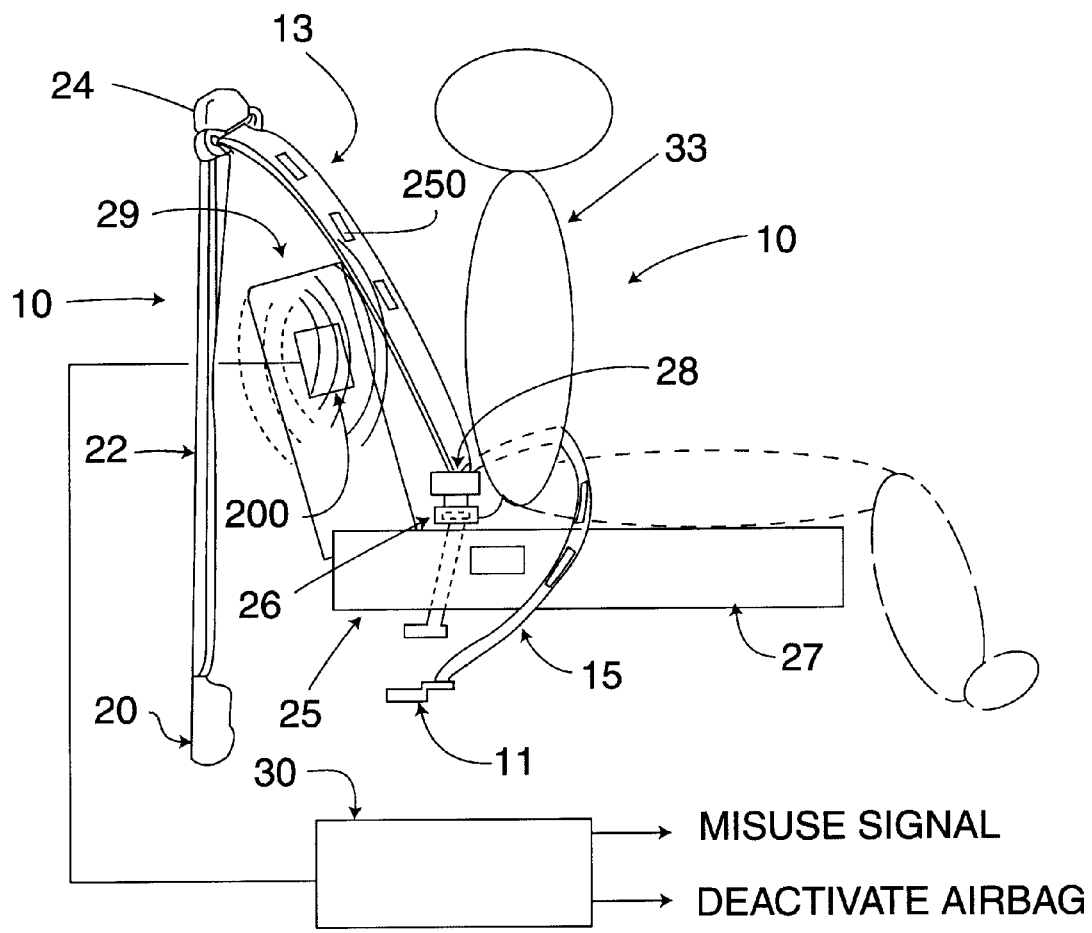
FIG. 2 illustrates a seat belt being improperly used.

The present invention proposes a means for detecting improper usage of the seat belt, i.e. misuse. When the seat belt system 10 is properly used, as illustrated in FIGS. 1 and 1A, the lap portion 15 of the seat belt webbing 22 is disposed on top of and across an occupant's lap or lower torso, and the shoulder portion 13 is disposed diagonally across and in front of the upper torso of the occupant 33. FIG. 2 shows the shoulder belt 13 in one condition of misuse. This condition of misuse will arise when the shoulder belt portion 13 is positioned behind a seated occupant with the tongue plate 28 locked within the buckle 26 or for example if the lap belt portion is positioned underneath the occupant.

Figure 6A:
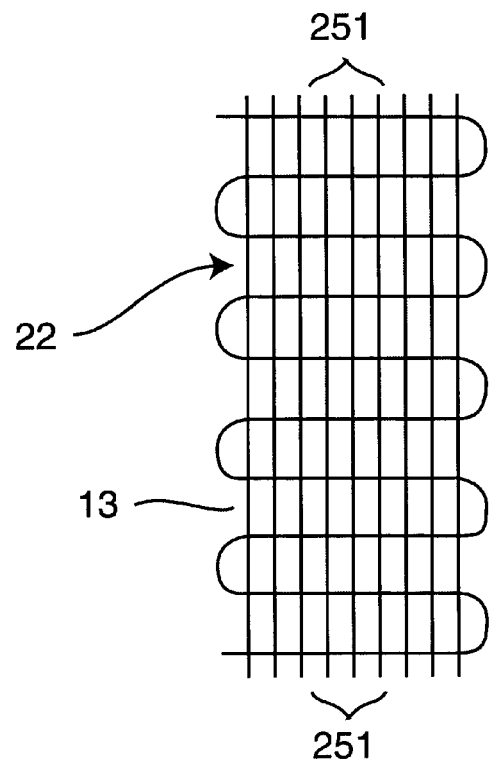
FIGS. 6A and 6B show alternate embodiments of the invention.
Figure 6B:
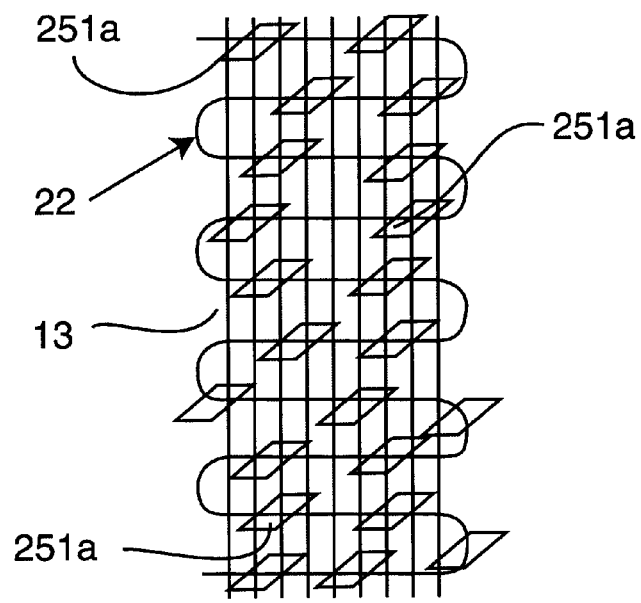

In the preferred embodiment of the invention a tag detection circuit 200 of FIGS. 1 and 2 is located in the seat back 29 and emits an electromagnetic field 202. An optional detection circuit 200a can be located within the seat cushion 27 to sense if the lap belt has been laid upon the cushion. In general the seat belt 22 is constructed with a metallic (amorphous metal or magnetostrictive material elements) object that will interfere with the electromagnetic field 202 so that the proximity of the seat belt can be detected. In one embodiment one or more metal tags 250 are attached to the shoulder portion 13 (or lap portion). In another embodiment the metallic object can be woven into the fabric of the seat belt. In this embodiment various strands 251 (see FIG. 6A) of an amorphous metal such as Metglas® made by Allied-Signal Inc. can be interwoven into the weft or warp fibers of the seat belt. A typical seat belt webbing comprises polyester fibers interwoven together wherein the metallic strands 251 would replace or be in addition to some or all of the weft or warp fibers. In a further embodiment the metallic object(s) can comprise flakes 251a of the metal which are contained in the dye used to color the seat belt.

FIG. 1 shows the use one or more discrete disturbance tags 250 secured to the shoulder belt portion 13 (or alternatively the lap belt 15). Each disturbance tag 250 is fixedly attached to the shoulder belt portion 13 (and/or lap portion) of the seat belt by an appropriate method such as by gluing, sonic welding, sewing, etc. The tabs 250 may be of uniform size or of a distributed size with some larger than others. When the disturbance tag 250 is positioned outside of a determinable boundary relative to field 202, the performance of the tag detection circuit 200 will be unaffected by the tag(s) 250 (or other equivalent metallic object such as the metal threads or strands 251 or metal flakes 251a) as illustrated in FIG. 1. When the disturbance tag 250 is more closely positioned within the field 202, each tag or tags will modify the electromagnetic field thereby providing an indication that the seat belt is being improperly used, i.e. misused. In the same manner described above, the tag detection circuit 200a may be located in the seat bottom 27 (shown in phantom line) and the disturbance tag 250 (metal strands or flakes) positioned on the lap portion 15 in order to detect the improper use of the lap portion 15.

The detection circuit 200 can be configured so that the field 202 also extends behind the back 29 of the seat 25. In this way, if the seat belt 22 is placed behind the seat back 29 the detection circuit 200 would also detect this situation. As can be appreciated, this rearward field could also be created using an additional detection circuit (not shown).

Figure 3:
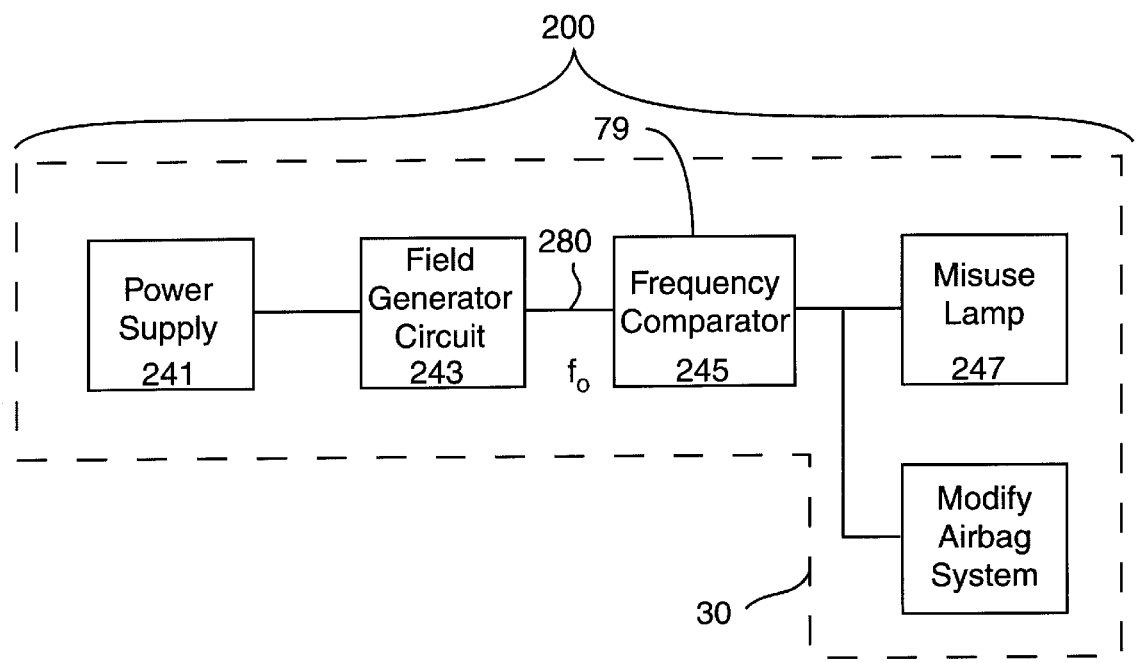
FIG. 3 illustrates a system block diagram showing additional features of the invention.

FIG. 3 shows a typical tag detection circuit 200. Circuit 200a would be identical, as would a circuit to produce a rearward directed field as mentioned above. The circuit 200 comprises a power supply circuit 241, a detection field generator circuit 243, a frequency comparator circuit 245 and a warning indication lamp or other indicator such as an audible (tone or voice) warning indicator 247 and initiates steps to modify the operation of the air bag/seat belt system (s). The power supply circuit 241 is electrically connected to and energizes the detection field generator circuit 243, comparator circuit 245 and/or indicator 247. The detection field generator circuit 243 reacts to the presence of the disturbance tag 250 (or fibers 251 or flakes 251a) and is electrically coupled to the frequency comparator 245. The frequency comparator determines whether the seat belt is being misused and generates a signal to activate the warning indicator 247 to alert the occupant of a condition of seat belt misuse and take other appropriate action.

Figure 4:
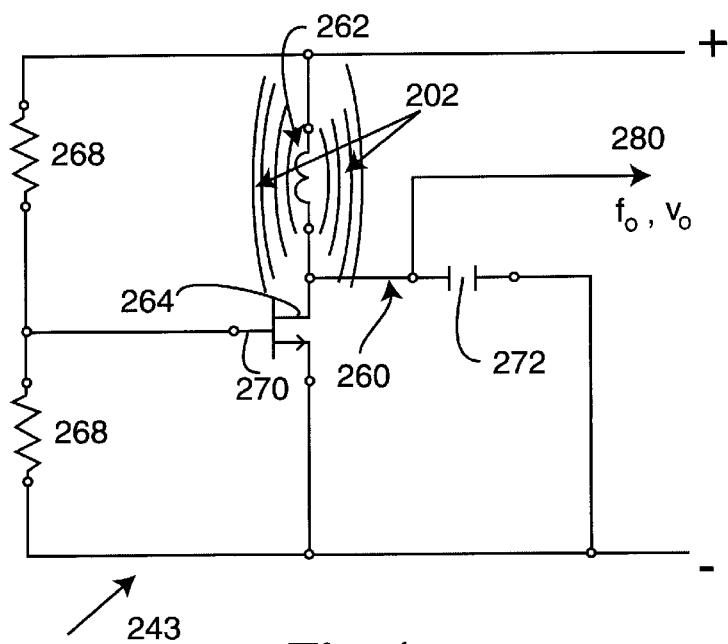
FIG. 4 shows an LC oscillator circuit usable with the present invention.

The detection field generator circuit 243 generates the electromagnetic field 202 (see FIG. 4) through the use of an LC oscillator circuit. The LC oscillator circuit 260 comprises an inductor coil 262 which generates the em-field 202 and is electrically coupled to the positive power terminal (+) at one end and to a collector terminal of transistor 264 at another end. A resistor 268 is connected in parallel with the inductor coil 262 and its high voltage potential end is connected to the positive power terminal. The low voltage potential terminal of inductor coil 262 is connected to both resistor 268 and the base terminal of transistor 270. The low potential end of resistor 268 and the emitter terminal of transistor 270 are connected to ground. A capacitor 272 is electrically coupled to the collector terminal of transistor 270 on its high potential side and to ground on its low potential side.

Figure 5:
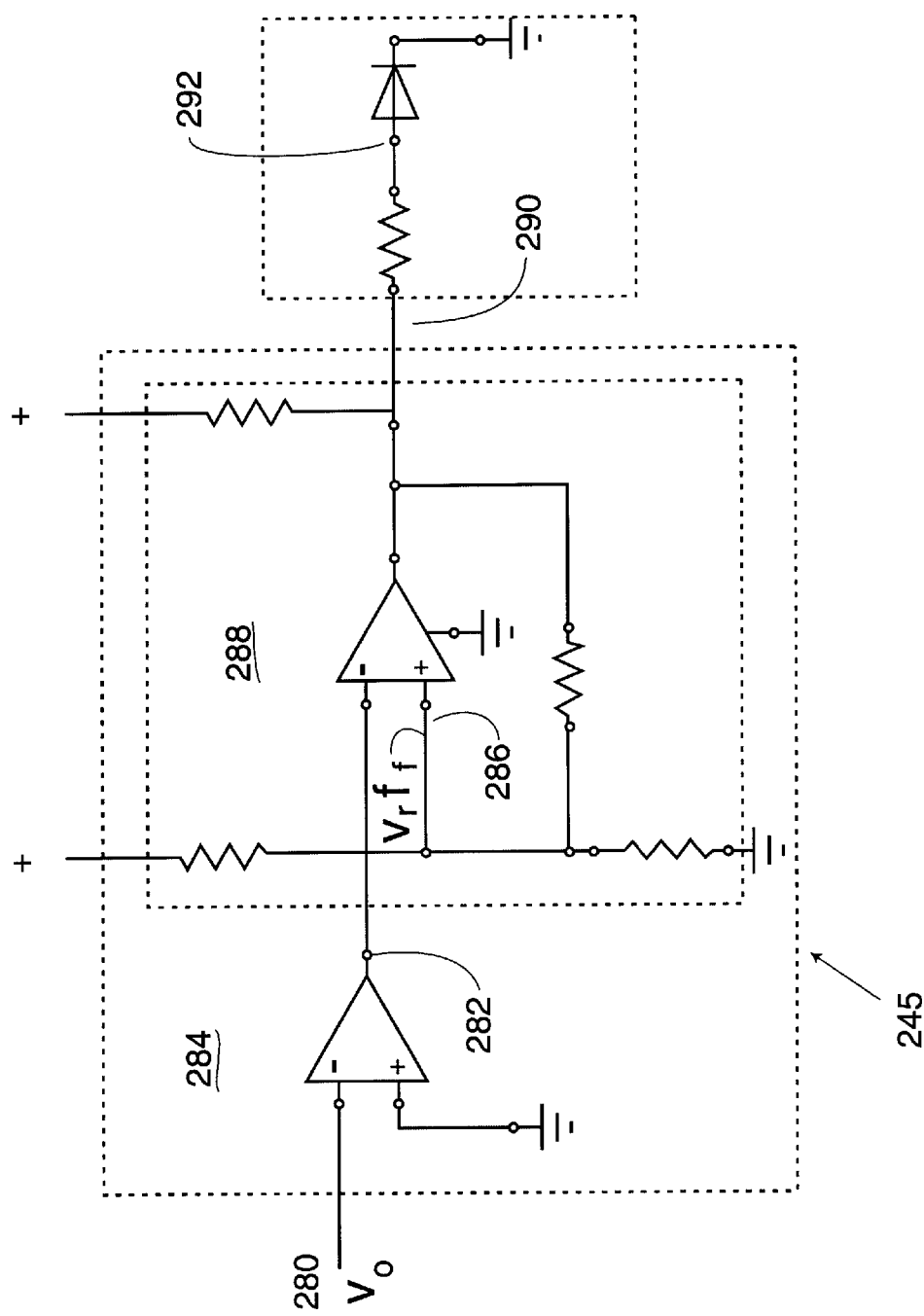
FIG. 5 shows a frequency comparator circuit.

The LC oscillator circuit, when energized, will generate an oscillatory output voltage $v_o$ (also see numeral 280) at a frequency $f_o$. The voltage signal $v_o$ is fed into the frequency comparator circuit 245. The frequency comparator circuit as shown in FIG. 5 includes a frequency-to-voltage converter 284 and a voltage comparator 288 both of which are well known in the art. The output voltage signal $v_o$ is first converted to a fixed voltage (see numeral 282) by the frequency-to-voltage converter 284 and then compared to a fixed reference voltage $f_f$ (also see numeral 286) by the voltage comparator 288 which corresponds to nominal frequency of the LC oscillator circuit.

Equation (1) below defines the oscillation frequency of the LC oscillation circuit. This frequency $f_o$ is:

$$f_o = 2\Pi(L_e/C)^{1/2} \qquad (1)$$

where:

$L_e$ is the effective inductance of the circuit equal to $(L_o + L_n)$.

$L_o$ is equal to the magnitude of the inductor 251, $L_n$, is equal to added inductance arising from the presence of the disturbance tag (thread, fibers or flakes) 250 and C is equal to the magnitude of the capacitance 272.

When the disturbance tag 250 is not present in the electromagnetic field 202 as shown in FIG. 1, that is, it is being properly worn and shielded or partially shielded by the occupant from the field 202, the frequency of the output voltage signal $v_o$ generated by circuit 243 will be defined by equation 2 since the added inductance $L_n$ is extremely small or zero. Typically the value of the circuit inductance $L_0$ and the capacitance C are chosen so that the natural frequency of the circuit 243 is about 100 KHz (when not affected by the tag 250).

$$f_o = 2\Pi(L_o/C)^{1/2} \qquad (2)$$

The output voltage $v_o$ will be less than the reference voltage $v_r$ (also see numeral 286) when the tag is not present in the detection field. This will cause the output voltage of the voltage comparator circuit 284 to remain at or about its low voltage level. When output voltage $v_o$ is at its low voltage level the comparator 288 will remain low. This state can be used to generate a signal (to the occupant) to indicate that the seat belt is being properly used and to provide information to the air bag system that the belt is being properly warn. This condition could optionally be signaled by another control signal.

When a disturbance tag 250 is present in the electromagnetic field 202, as shown in FIG. 2, the effective inductance increase to a value $L_o + L_n$. This in turn will increase the natural frequency $f_o$ by for example 10% to 110 KHz according to the equation 1. This increase in the frequency of voltage signal $v_o$ will be used as an indication that the disturbance tag is disposed within the electromagnetic field and an indication of improper seat belt usage. The voltage signal $v_o$ having an increased frequency is converted to a new fixed voltage 282 by the frequency to voltage converter 284 which is again compared to the fixed reference voltage $v_r$ by the voltage comparator 288. The output voltage 282 of the converter 284 will be greater than the reference voltage $v_r$ (also numeral 286) due to the presence of the disturbance tag in the electromagnetic field. In the present invention when the output voltage $v_o$ is equal to or greater than the reference voltage $v_r$ the comparator output voltage 290 will swing to its high voltage level and trigger a warning indication 292 to the occupant, as well as deactivate the air bag system 100. The warning indication lamp (buzzer, voice output) 247 will be activated and indicate that the seat belt is being improperly used.

Figure 7:
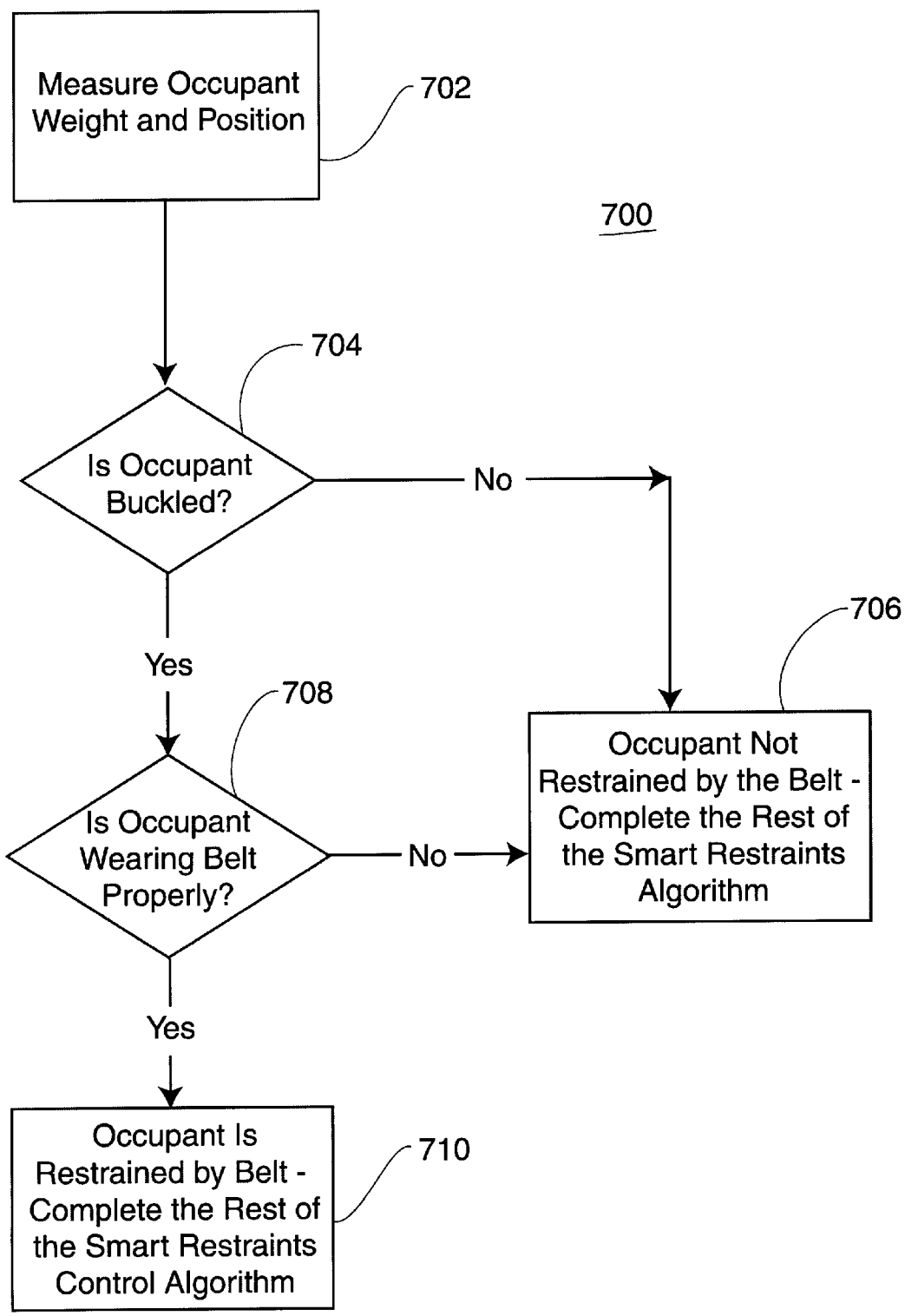
FIG. 7 illustrates how a seat belt usage signal can be integrated into the operation of a smart restraint system.

Reference is briefly made to FIGS. 7, 1 and 1A which further illustrate how the misuse signal can be used within a smart safety restraint system. As is now more commonly known in the art, such a smart restraint system in addition to including a seat belt and air bag system includes means for determining the position of the occupant relative to, for example, the steering wheel or instrument panel. This determining means is shown in FIG. 1 as a sonic sensor 300 which in combination with a control unit measures the distance of the occupant from a fixed location in the vehicle. Smart restraint systems now also propose a means for measuring one or more characteristics of the occupant such as weight so that the operation of the air bag 104 can be tailored to protect large versus small occupants. Such determining means may comprise a weight sensor 302 located in the seat 24 (see FIG. 1A). FIG. 7 is a flow chart diagramming the operation of one such smart restraint system 700. In block 702, the system measures the weight and position of the occupant. The system then (see block 704) determines if the seat belt 20 is properly buckled such as by interrogating the state of the buckle switch 31. If the buckle switch signal 31a does not indicate that the occupant is properly secured by the seat belt 22, operation of the system 700 switches to a default mode (see block 706) in which activation of the air bag and/or pretensioner are prohibited and the occupant is instructed to buckle the belt 22. If the buckle switch provides (block 704) an indication that the tongue has been inserted within the buckle the system 700 now determines if the seat belt is being properly used (see block 708) such as by interrogating signal 292. If the seat belt 22 is being misused the system again operation defaults to its default mode (see block 706). If the seat belt is being properly worn system operation continues (see block 710) wherein air bag and pretensioner activation is permitted.

Many changes and modifications in the above-described embodiment of the invention can, of course, be carried out without departing from the scope thereof. Accordingly, that scope is intended to be limited only by the scope of the appended claims.

What is claimed is:

1. An occupant safety protection system (10) comprising:
   a safety belt system (8) including a shoulder belt portion (13) and lap belt portion (15) and a tongue associated with the belt system that is lockable within a buckle, wherein when used properly to restrain the occupant the tongue is locked within the buckle and the shoulder belt portion and the lap belt portion are respectively disposed across the upper torso and the lower torso of the occupant respectively;
   sensing means for generating a signal indicating the tongue latched within the buckle, and
   first means for determining if either the shoulder belt and lap portions is in a position indicative of seat belt misuse as distinguished from a condition in which the tongue is not in the buckle;
   control means, responsive to the first means, for modifying the operation of a safety component upon determining a condition of misuse;
   wherein the safety component includes at least one of an air bag inflator (107), retractor pretensioner (20a) and buckle pretensioner (26a).

2. The system as defined in claim 1 including indication means for informing the occupant of a condition of belt misuse.

3. An occupant safety protection system (10) comprising:
   a safety belt system (8) including a shoulder belt portion (13) and lap belt portion (15) which when used properly to restrain the occupant are disposed across the upper torso and the lower torso of the occupant respectively wherein the shoulder belt portion and the lap belt portion include ferrous material;
   sensing means for generating a signal indicating the tongue latched within the buckle, and
   first means for sensing the presence of the ferrous material and for determining if either the shoulder belt portion is positioned behind the occupant and the lap belt portion is positioned below the occupant;
   further including second means for preventing the inflation of an associated air bag upon sensing either the shoulder belt portion is positioned behind the occupant or the lap belt portion is positioned below the occupant.

4. The system as defined in claim 3 wherein the said ferrous material is woven into the entire length of said shoulder belt portion (13) and said lap belt portion (15).

5. The system as defined in claim 3 wherein the said ferrous material is fixedly attached to said shoulder belt portion (13) and said lap belt portion (15).

6. An occupant safety protection system (10) comprising:
   a safety belt system (8) including a shoulder belt portion (13) and lap belt portion (15) which when used properly to restrain the occupant are disposed across the upper torso and the lower torso of the occupant respectively wherein the shoulder belt portion and the lap belt portion include material capable of being sensed;
   sensing means for generating a signal indicating the tongue latched within the buckle, and
   first means for sensing the presence of the material and for determining if either the shoulder belt portion is positioned behind the occupant and the lap belt portion is positioned below the occupant;
   further including second means for preventing the inflation of an associated air bag upon sensing either the shoulder belt portion is positioned behind the occupant or the lap belt portion is positioned below the occupant.

* * * * *